US009168818B2

(12) United States Patent
Hirai et al.

(10) Patent No.: US 9,168,818 B2
(45) Date of Patent: Oct. 27, 2015

(54) ELECTRIC VEHICLE

(71) Applicant: NTN CORPORATION, Osaka (JP)

(72) Inventors: Isao Hirai, Shizuoka (JP); Tetsuya Yamamoto, Shizuoka (JP); Wataru Yamada, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/379,523

(22) PCT Filed: Jan. 24, 2013

(86) PCT No.: PCT/JP2013/051446
§ 371 (c)(1),
(2) Date: Aug. 19, 2014

(87) PCT Pub. No.: WO2013/125287
PCT Pub. Date: Aug. 29, 2013

(65) Prior Publication Data
US 2015/0027795 A1    Jan. 29, 2015

(30) Foreign Application Priority Data
Feb. 22, 2012   (JP) ................................ 2012-036364

(51) Int. Cl.
*B60K 7/00*     (2006.01)
*B60K 1/00*     (2006.01)
*B60G 3/00*     (2006.01)
(Continued)

(52) U.S. Cl.
CPC ... *B60K 1/00* (2013.01); *B60G 3/00* (2013.01); *B60G 13/003* (2013.01); *B60K 1/04* (2013.01); *B60K 7/0007* (2013.01); *B60K 17/356* (2013.01); *B60K 26/02* (2013.01); *B60T 7/02* (2013.01); *B60T 8/17* (2013.01); *B62D 21/11* (2013.01); *B60K 2001/001* (2013.01); *B60K 2001/0411* (2013.01);
(Continued)

(58) Field of Classification Search
CPC ........................................................ B60K 1/04
USPC ............ 180/65.1–65.265, 54.1, 311; 280/785
See application file for complete search history.

(56) References Cited

U.S. PATENT DOCUMENTS

| 4,881,756 | A  | * | 11/1989 | Kumasaka et al. | ........... 280/785 |
| 7,441,809 | B1 | * | 10/2008 | Coombs et al. | ............... 280/785 |
| 8,215,692 | B2 | * | 7/2012  | Oriet et al. | ................. 296/26.08 |

FOREIGN PATENT DOCUMENTS

| JP | 3584106 | 8/2004 |
| JP | 2005-510391 | 4/2005 |

(Continued)

*Primary Examiner* — John Walters
*Assistant Examiner* — James Triggs
(74) *Attorney, Agent, or Firm* — Clark & Brody (57) ABSTRACT

An electric vehicle includes: a body that includes a body frame; a driving module that includes a sub-frame detachable from the body frame, driving wheels, a driving device provided with a motor mounted on the sub-frame and applying driving force to the driving wheels to start or accelerate the electric vehicle, a driving-wheel suspension device attached to the sub-frame, a driving-wheel brake device stopping or decelerating the electric vehicle, and some other components; a connection unit that maintains the relative position relationship between the body and driving module upon attachment of the sub-frame to the body frame and connects the body to the driving module with signal lines; and a control unit that controls the driving module under an input signal input from the body side through the signal lines connected with the connection unit.

16 Claims, 8 Drawing Sheets (51) Int. Cl.
*B60T 8/17* (2006.01)
*B60K 17/356* (2006.01)
*B62D 21/11* (2006.01)
*B60G 13/00* (2006.01)
*B60K 1/04* (2006.01)
*B60K 26/02* (2006.01)
*B60T 7/02* (2006.01)

(52) U.S. Cl.
CPC ............... *B60K 2007/0046* (2013.01); *B60K 2007/0061* (2013.01); *B60T 2260/06* (2013.01)

(56) References Cited

FOREIGN PATENT DOCUMENTS

| | | |
|---|---|---|
| JP | 2007-022276 | 2/2007 |
| JP | 2008-105645 | 5/2008 |
| JP | 2009-532277 | 9/2009 |
| JP | 2009-286303 | 12/2009 |
| JP | 2012-001196 | 1/2012 |
| WO | 2006/030532 | 3/2006 |

* cited by examiner

ELECTRIC VEHICLE

TECHNICAL FIELD

This invention relates to electric vehicles.

BACKGROUND ART

Recently, the development of electric vehicles using motors as an alternative power source to engines has been conducted actively. In such electric vehicles, the motors are used to drive wheels.

Technologies relating to the electric vehicles are disclosed in Japanese Unexamined Patent Publication Nos. 2007-022276 (PTL 1), 2009-286303 (PTL 2), and Japanese Patent Publication No. 3584106 (PTL 3).

PTL 1 discloses a motor mount developed for the purpose of improving responsiveness in turning control. Specifically, in an electric-powered vehicle, the motor mount performs property change processing to harden a property-variable elastic body of drive motors in synchronization with turning control executed by which the drive motors capable of rotating to drive wheels make a difference in driving torque between the left and right wheels. The motor mount includes suspension members and sub-frames.

PTL 2 discloses a body structure of an electric vehicle in which left and right motors, which are used in a pair, are arranged so that their axes of rotation are oriented roughly in a width direction of the vehicle and roughly aligned with each other. The body structure includes a cradle frame that supports the motors integrally so as to maintain the relative position relationship between the motors, and a sub-frame that functions as a body-side attachment for suspension arms and the like used to support left and right rear wheels and is attached to a bottom part of the vehicle body.

According to PTL 3, a drive for an electric vehicle includes drive units respectively provided to running wheels serving as driving wheels and simultaneously controls the respective drive units to change speed based on one of rotation signals from a rotational speed sensor.

CITATION LIST

Patent Literature

PTL1: Japanese Unexamined Patent Publication No. 2007-022276
PTL2: Japanese Unexamined Patent Publication No. 2009-286303
PTL3: Japanese Patent No. 3584106

SUMMARY OF INVENTION

Technical Problem

Electric vehicles are expected to be more commonly used as future environmental-friendly transport and traveling means that do not emit exhaust gas while the vehicles are moving. However, in the case where the electric vehicles are used for home use, delivery services, and so on, the following concerns may possibly arise.

In a case of a family, for example, when they need to increase the seating capacity of their car due to an increase in the number of family members, even if the car has no malfunctions in mechanisms for driving wheels and can still work well, there is no measures to increase the seating capacity and consequently the family needs to buy a new electric car. On another occasion, although an increase of the electric car seating capacity is not required, there may be a demand for change of the wheel drive mechanism depending on circumstances and seasons, for example, from two-wheel drive to four-wheel drive. More specifically, for example, two-wheel drive may be required from the viewpoint of efficiency enhancement to increase electrical traveling efficiency in summer time, while four-wheel drive may be required from the viewpoint of safety improvement with concern for snow in winter time.

The disclosures of PTL 1 to PTL 3 cannot deal with such cases. The object of the present invention is to easily construct an electric vehicle that meets the needs of users.

Solution to Problem

The electric vehicle according to the present invention is an electric vehicle propelled by a motor that rotates to drive driving wheels, and includes: a body that includes a body frame; a driving module that includes a sub-frame detachable from the body frame, driving wheels, a driving device provided with a motor mounted on the sub-frame and applying driving force to the driving wheels to start or accelerate the electric vehicle, a driving-wheel suspension device attached to the sub-frame, and a driving-wheel brake device stopping or decelerating the electric vehicle; a connection unit that maintains the relative position relationship between the body and driving module upon attachment of the sub-frame to the body frame and connects the body and the driving module with signal lines; and a control unit that controls the driving module under an input signal input from the body side through the signal lines connected with the connection unit.

According to the electric vehicle, since the body frame included in the body and the sub-frame included in the driving module are configured to be detachable from each other, the user can select a desired body from various prepared bodies as well as select a desired driving module from various prepared driving modules in accordance with the user's needs and application, and can attach the selected driving module to the selected body to construct an electric vehicle. If the user's needs change, the user can remove the body side or driving module side and attach a desired body or desired driving module in accordance with the change. In this case, the body includes the body frame and the driving module includes the sub-frame, driving device, and some other components, and when the sub-frame is attached to the body frame, the body and driving module are connected to each other with the signal line, thereby controlling the driving module under an input signal input from the body side. Therefore, there is no problem in operation of the electric vehicle. Thus, combinations of the body and driving module can readily provide an electric vehicle constructed to meet the user's needs.

The electric vehicle may be configured to include a driven module provided with driven wheels and a driven-wheel suspension device.

The electric vehicle may be configured to include a steering device that steers at least one of a set of the driving wheels and a set of the driven wheels.

The connection unit may include a body connector provided on the body side and a driving-module connector provided on the driving module side, and the signal lines may be connected by coupling the body connector to the driving-module connector.

The body may include an accelerator pedal or an accelerator lever provided to the body frame, and the control unit may be configured to control the motor under a signal based on the amount that the accelerator pedal is depressed or a signal based on the amount of change in the angle of the accelerator lever, both the signals being input from the body side.

The body may include a brake pedal or a brake lever provided to the body frame, and the control unit may be configured to control at least one of the driving-wheel brake device and driven-wheel brake device under a signal based on the amount that the brake pedal is depressed or a signal based on the amount of change in the angle of the brake lever, both the signals being input from the body side.

The body may include a steering wheel provided to the body frame, and the control unit may be configured to control the steering device under a signal based on the amount of change in the angle of the steering wheel and being input from the body side.

At least one of the driving-wheel suspension device and the driven-wheel suspension device may include a damper that absorbs shock and the damper may be actuated or stopped by a motor intended for the damper.

The driving module may include an inverter used to supply electric power to at least one of the driving device, driving-wheel brake device, driving-wheel suspension device, and steering device.

The driving module may include a microcomputer used to control at least one of the driving device, driving-wheel brake device, driving-wheel suspension device, and steering device.

The electric vehicle may include a battery to supply electric power to the driving module, and the battery may be configured to be provided in the driving module.

In addition, the electric vehicle may include a battery to supply electric power to the driving module. The battery may be provided in the body and the control unit may be configured to control electric power supply from the battery provided on the body side to the driving module when the sub-frame is attached to the body frame with the connection unit.

The body frame and sub-frame may include engagement units that are engaged with each other.

The sub-frame may be attached to the body frame with an elastic member interposed therebetween.

The motor may be attached to the sub-frame with an elastic member interposed therebetween.

Furthermore, the driving module may be configured to adopt at least one of a two-motor system in which two motors drive the driving wheels, provided as a pair of left and right driving wheels, respectively, a one-motor system in which a single motor drives both the left and right driving wheels, and an in-wheel motor system in which two in-wheel motors placed at the interior of the left and right driving wheels drive the left and right driving wheels, respectively.

Advantageous Effects of Invention

According to the configurations, since the sub-frame included in the driving module and the body frame included in the body are configured to be detachable from each other, the user can select a desired body from various prepared bodies as well as select a desired driving module from various prepared driving modules in accordance with the user's needs and application and can attach the selected driving module to the selected body to construct an electric vehicle. If the user's needs change, the user can remove the body side or driving module side and attach a desired body or desired driving module in accordance with the change. In this case, the body includes the body frame and the driving module includes the sub-frame, driving device, and some other components, and when the sub-frame is attached to the body frame, the body and driving module are connected to each other with the signal lines, thereby controlling the driving module under an input signal input from the body side. Therefore, there is no problem in operation of the electric vehicle. Thus, combinations of the body and driving module can readily provide an electric vehicle constructed to meet the user's needs.

DESCRIPTION OF EMBODIMENTS

Figure 1:
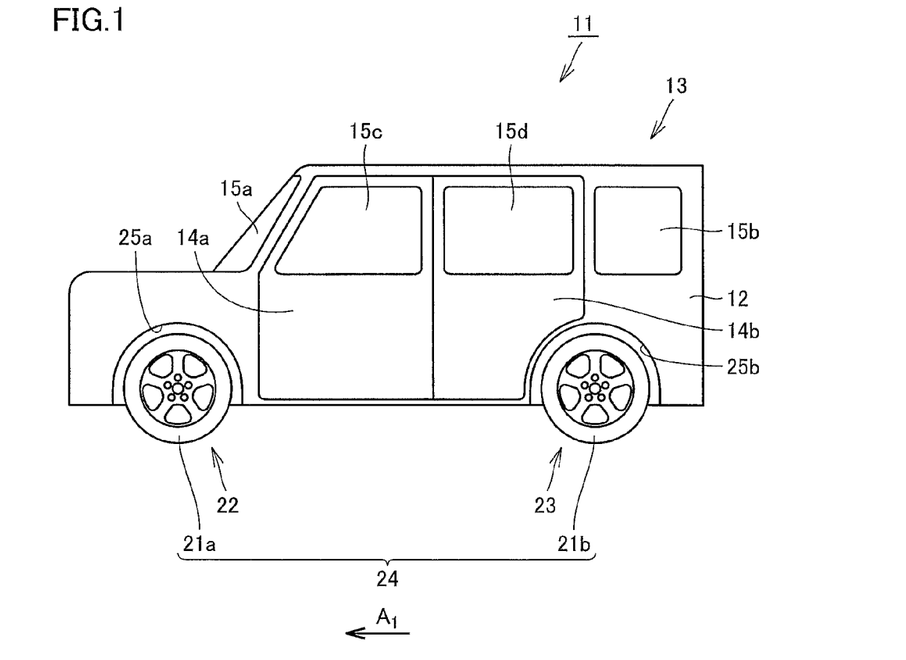
FIG. 1 is a schematic diagram of an electric vehicle according to an embodiment of the present invention.
Figure 2:
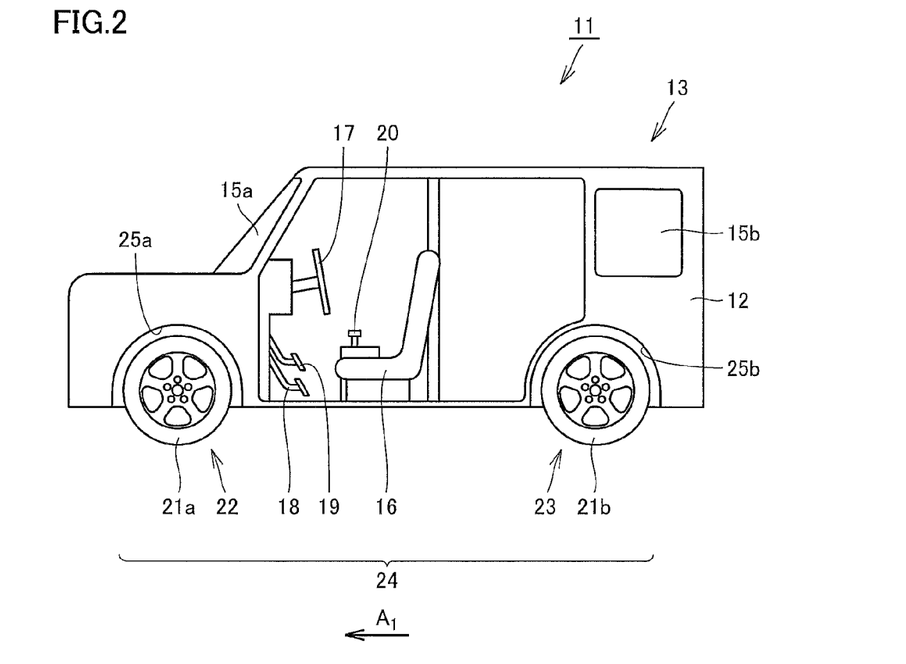
FIG. 2 is a schematic diagram of the electric vehicle of FIG. 1, partially showing the internal structure, according to the embodiment of the present invention.
Figure 3:
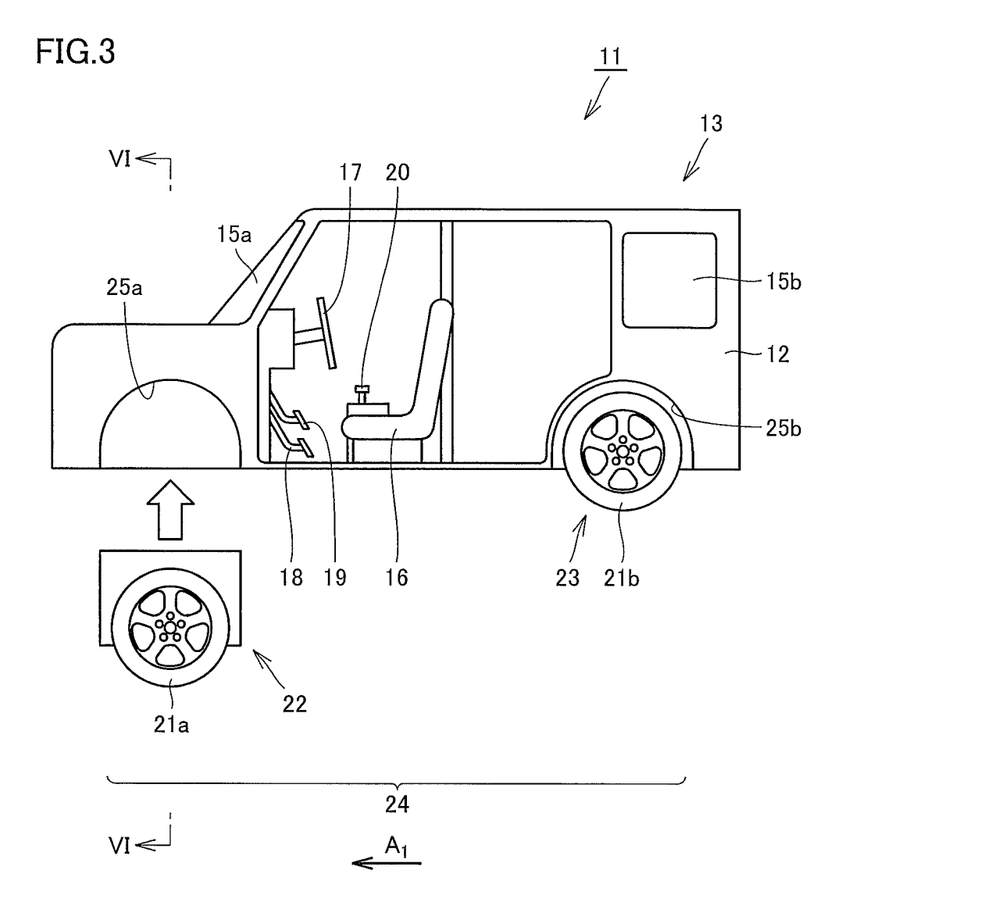
FIG. 3 is a schematic diagram of the electric vehicle of FIG. 2 with a propulsion module, which will be described later, removed.

With reference to the drawings, embodiments of the present invention will be described below. FIG. 1 is a schematic diagram of an electric vehicle according to an embodiment of the present invention. FIG. 2 is a schematic diagram of the electric vehicle of FIG. 1 with a door, which will be described later, removed. FIG. 3 is a schematic diagram of the electric vehicle of FIG. 2 with a driving module, which will be described later, removed. Note that a forward direction in which the electric vehicle is headed corresponds to a leftward direction indicated by an arrow $A_1$ in FIG. 1. In addition, among the front and back sides of the drawing sheet of FIG. 1, the front side shows the left side of the electric vehicle.

Referring to FIGS. 1 to 3, the structural configuration of an electric vehicle 11 according to an embodiment of the invention will firstly be described. The electric vehicle 11 according to the embodiment of the invention is an electric vehicle propelled by a motor that rotates to drive driving wheels. The electric vehicle 11 includes a body 13 provided with a body frame 12 that forms the contour of the vehicle. The body 13 is mounted on the body frame 12 and includes a left-right pair of front doors 14a and a left-right pair of rear doors 14b. On the front side of the body frame 12 provided is a front glass 15a ensuring forward visibility from a driver's seat which will be described later. In addition, the body frame 12 and doors 14a, 14b have glass windows 15b, 15c, 15d, respectively, at predetermined positions.

In the interior of the electric vehicle 11, there are seats 16 for occupants provided on the front side corresponding to the door 14a and on the rear side corresponding to the door 14b. In FIGS. 2 and 3, the seat on the rear side is omitted. The seat 16 depicted in FIG. 2 is a driver's seat used to drive the electric vehicle 11. Specifically, a user, that is a driver, sits in the seat 16 to operate the electric vehicle 11.

In the interior of the electric vehicle 11, there are a steering wheel 17 used to steer the electric vehicle 11, an accelerator pedal 18 used to drive the electric vehicle 11, a brake pedal 19 used to brake the electric vehicle 11, and a shift lever 20 used to change gears or the like of the electric vehicle 11. The steering wheel 17, accelerator pedal 18, brake pedal 19, and shift lever 20 are arranged within a range where the user in the seat 16 can manipulate them. There are more operating tools to operate the actions of the electric vehicle 11 in the interior of the electric vehicle 11; however, the illustration and explanation of the tools are omitted. Therefore, typical actions of the electric vehicle 11 will be described below with the steering wheel 17 and other components.

The electric vehicle 11 includes a driving module 22 that drives front wheels 21a serving as driving wheels and a driven module 23 that rotates rear wheels 21b serving as driven wheels. The driven module 23 including the rear wheels 21b serving as driven wheels includes a driven-wheel suspension device, not shown in the drawings. The driving module 22 and driven module 23 make up a propulsion module 24 that propels the electric vehicle 11. The electric vehicle 11 adopts a so-called front-wheel drive system. The driven module 23 is attached and secured on the rear side of the body 13 so that the rear wheels 21b can rotate. The body 13 has recessed portions 25a, 25b that are bowed inward along the shape of the front wheel 21a and rear wheel 21b from the lower side of the body 13 so as to accommodate the front wheel 21a and rear wheel 21b.

Figure 4:
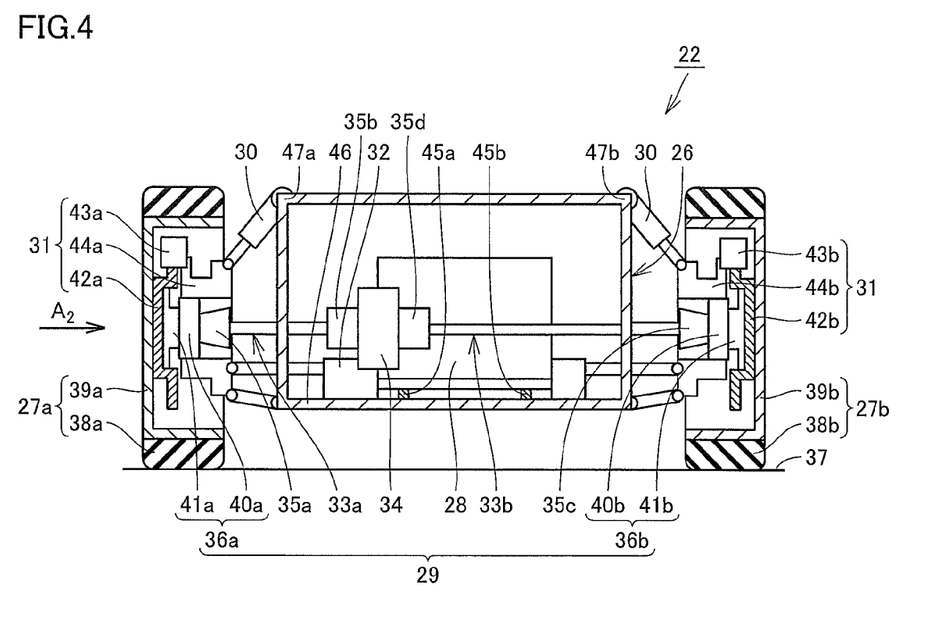
FIG. 4 is a schematic cross-sectional view illustrating the configuration of the propulsion module provided to the electric vehicle according to the embodiment of the invention.

Next, the configuration of the driving module 22 provided to the electric vehicle 11 will be described. FIG. 4 is a schematic cross-sectional view illustrating the configuration of the driving module 22 provided to the electric vehicle 11 according to the embodiment of the invention. The configuration is not partially illustrated in the cross-sectional view in FIG. 4 to provide a clear understanding. FIG. 4 shows a cross section taken along IV-IV in FIG. 3. FIG. 1 is an illustration viewed from the direction indicated by an arrow $A_2$ in FIG. 4.

Referring to FIGS. 1 to 4, the driving module 22 includes a sub-frame 26 that makes up a frame, a left-right pair of driving wheels 27a, 27b, a driving device 29 that is provided with a motor 28 mounted on the sub-frame 26 and supplies driving force to the driving wheels 27a, 27b to start or accelerate the electric vehicle 11, a left-right pair of driving-wheel suspension devices 30 that is attached to the sub-frame 26, and a left-right pair of driving-wheel brake devices 31, the driving-wheel brake devices 31 being attached to the driving-wheel suspension devices 30, respectively, and used to stop or decelerate the electric vehicle 11. The sub-frame 26 making up a frame is roughly rectangular in the cross section shown in FIG. 4, or as viewed from the rear side of the electric vehicle 11.

The driving module 22 provided in the electric vehicle 11 includes a steering device 32 that steers the left-right pair of driving wheels 27a, 27b. The front wheel 21a shown in FIG. 1 and other drawings correspond to the driving wheel 27a.

The driving device 29 included in the driving module 22 includes a left-right pair of drive shafts 33a, 33b that transmits rotation of the motor 28 to the driving wheels 27a, 27b, a differential gear 34, left-and-right pairs of constant-velocity joints 35a, 35b and 35c, 35d placed on the opposite ends of drive shafts 33a, 33b, respectively, and a left-right pair of driving-wheel bearing devices 36a, 36b that receives loads imposed by the drive shafts 33a, 33b and other components.

The driving wheels 27a, 27b respectively include circular tires 38a, 38b, which are provided as a left-right pair and make contact with road surfaces 37, and wheels 39a, 39b, which are provided as a left-right pair and are attached on the radially inner side of the tires 38a, 38b, respectively. The driving-wheel bearing devices 36a, 36b respectively include bearings 40a, 40b provided as a left-right pair and wheel hubs 41a, 41b provided as a left-right pair. The driving-wheel brake devices 31 respectively include circular plate-like brake discs 42a, 42b provided as a left-right pair, brake calipers 43a, 43b provided as a left-right pair, and brake knuckles 44a, 44b provided as a left-right pair.

The motor 28 is mounted on a plate portion 46 provided on the lower side of the sub-frame 26 making up a frame. A left-right pair of bushing mounts 45a, 45b serving as an elastic member is interposed between the motor 28 and the plate portion 46. As an example of the elastic member, rubber material can be cited. Alternatively, the bushing mounts 45a, 45b may be made of damping alloy or the like. In this case, more specifically, for example, damping alloy D2052 manufactured by Daido Steel Co., Ltd. can be adopted. These materials can make the vibration from the motor 28 harder to be transmitted to the sub-frame 26. However, the bushing mounts 45a, 45b can be dispensed with unless they are needed.

The steering device 32 is attached on the sub-frame 26 and in front of the motor 28. The left and right driving-wheel suspension devices 30 respectively have upper ends coupled to left and right corners 47a, 47b on the upper side of the sub-frame making up a frame. The lower ends of the left and right driving-wheel suspension devices 30 are coupled to the left and right brake knuckles 44a, 44b, respectively.

The sub-frame 26 included in the driving module 22 is detachably mounted on the body frame 12 included in the body 13. Specifically, the sub-frame 26 included in the driving module 22 can be removed from the body frame 12 provided on the body 13 side. FIG. 3 shows the equivalent situation when the sub-frame 26 has been removed from the body frame 12.

Though it is not illustrated, the body frame 12 and sub-frame 26 may have an engagement unit serving as a connection unit for engaging with each other. The sub-frame 26 can be configured to be attached to the body frame 12 through engagement by means of the engagement unit. The engagement unit may be composed of, for example, a rail guide provided on the body frame 12 side and a claw-like guide hook provided on the sub-frame 26 side.

Figure 5:
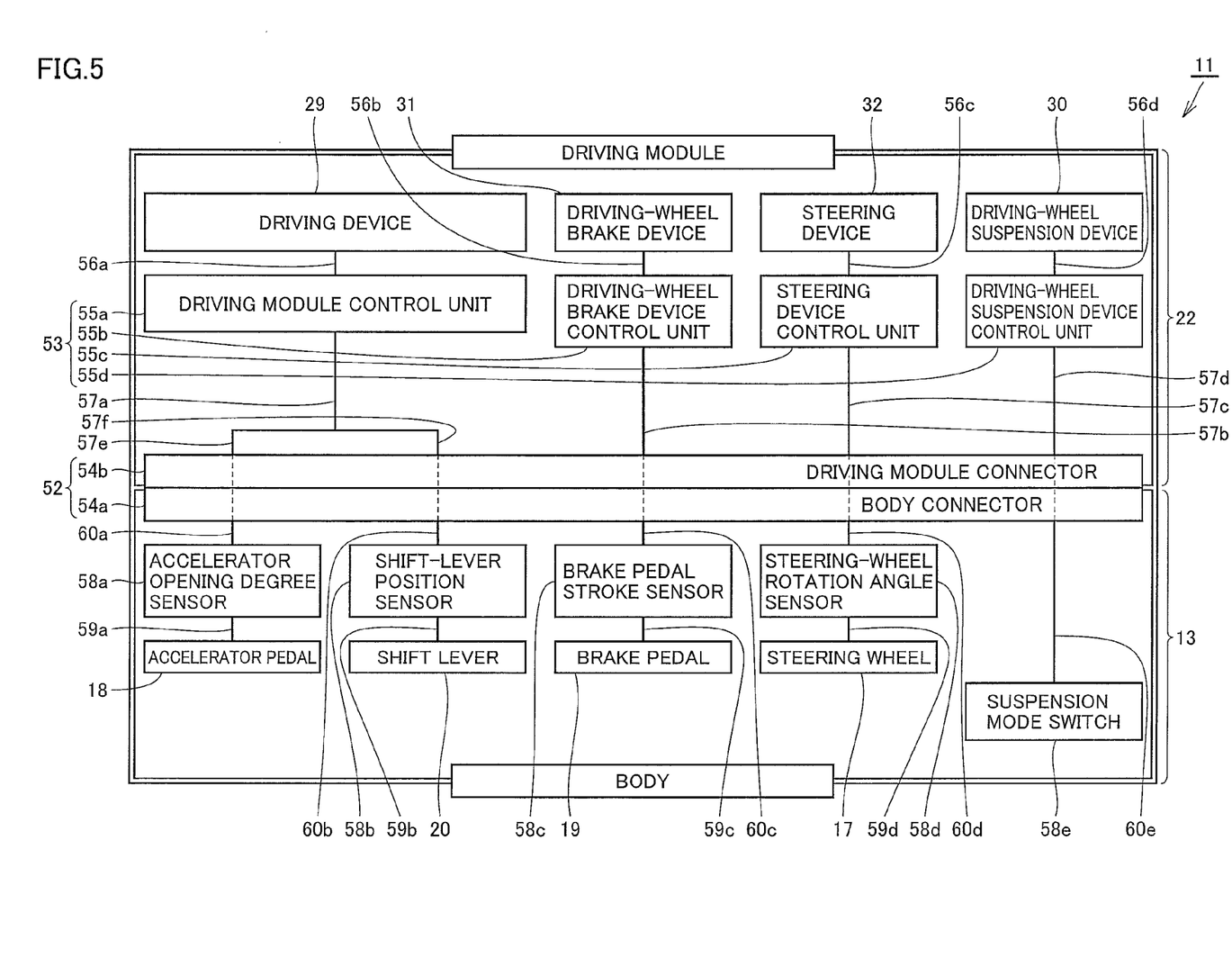
FIG. 5 is a block diagram illustrating the connectivity relationship of signal lines to show the electrical connection of the electric vehicle in FIG. 1 according to the embodiment of the invention.

Next, electrical configuration of the electric vehicle 11 will be described. FIG. 5 is a block diagram showing the connectivity relationship of signal lines connected with the connection units in the electric vehicle 11 of FIG. 1.

Referring to FIGS. 1 to 5, the electric vehicle 11 includes a connection unit 52 that connects the body 13 and the driving module 22 with signal lines when the sub-frame 26 is attached to the body frame 12 and a control unit 53 that controls the driving module 22 under an input signal input from the body 13 side through the signal lines connected by the connection unit 52. In FIG. 5 and also FIG. 6 described below, the relatively upper parts of the drawings indicate the driving module 22 side, while the relatively lower parts of the drawings indicate the body 13 side.

The connection unit 52 includes a body connector 54a provided to the body 13 side and a driving module connector 54b provided to the driving module 22 side. The body connector 54a and the driving module connector 54b are configured to fit into each other. By coupling the body connector 54a to the driving module connector 54b the connection unit 52 connects the signal lines from the body 13 side to the driving module 22 side. In addition, the connection unit 52 includes a holding part, though it is not illustrated, that maintains the relative position relationship between the body 13 and the driving module 22 when the sub-frame 26 is attached to the body frame 12. The holding part fastens the body frame 12 and sub-frame 26 by fastening means, such as a bolt and nut, to secure them. Thus, the relative position relationship between the body frame 12 and sub-frame 26 is maintained when the sub-frame 26 is attached to the body frame 12. The fastening means, such as a bolt and nut, used herein is something easy to attach and detach the sub-frame 26 to/from the body frame 12. The aforementioned engagement unit is part of the holding part.

The control unit 53 includes a driving device control unit 55a that electrically controls the driving device 29, a driving-wheel brake device control unit 55b that electrically controls the driving-wheel brake device 31, a steering device control unit 55c that electrically controls the steering device 32, and a driving-wheel suspension device control unit 55d that electrically controls the driving-wheel suspension device 30.

The driving device control unit 55a, driving-wheel brake device control unit 55b, steering device control unit 55c, and driving-wheel suspension device control unit 55d include inverters, respectively, that convert power between direct current and alternating current to supply electric power to the driving device 29, driving-wheel brake device 31, steering device 32, and driving-wheel suspension device 30, respectively. In addition, the driving device control unit 55a, driving-wheel brake device control unit 55b, steering device control unit 55c, and driving-wheel suspension device control unit 55d include microcomputers, respectively, that control the driving device 29, driving-wheel brake device 31, steering device 32, and driving-wheel suspension device 30, respectively. The inverters and microcomputers are not illustrated in the drawings.

The driving device 29 and the driving device control unit 55a are connected to each other with a signal line 56a. Through this signal line 56a, the driving device control unit 55a can control the components making up the driving device 29, for example, it can control the torque to be generated by the motor 28. The driving-wheel brake device 31 and driving-wheel brake device control unit 55b are connected to each other with a signal line 56b. Through this signal line 56b, the driving-wheel brake device control unit 55b can control the components making up the driving-wheel brake device 31, for example, it can control the movement of the left and right brake calipers 43a, 43b. The steering device 32 and steering device control unit 55c are connected to each other with a signal line 56c. Through this signal line 56c, the steering device control unit 55c can control the movement of the components making up the steering device 32. The driving-wheel suspension device 30 and driving-wheel suspension device control unit 55d are connected to each other with a signal line 56d. Through this signal line 56d, the driving-wheel suspension device control unit 55d can control the movement of the components making up the driving-wheel suspension device 30.

In addition, the driving device control unit 55a, driving-wheel brake device control unit 55b, steering device control unit 55c, and driving-wheel suspension device control unit 55d are provided with signal lines 57a, 57b, 57c, 57d extending toward the driving module connector 54b, respectively. The signal line 57a extending from the driving device control unit 55a is split into two signal lines 57e, 57f at some point.

The control unit 53 includes an accelerator opening degree sensor 58a that detects the opening degree of the accelerator having a correlation with the amount of which the accelerator pedal 18 is depressed, a shift-lever position sensor 58b that detects the position of the shift lever 20, a brake pedal stroke sensor 58c that detects the amount of which the brake pedal 19 is depressed, and a steering-wheel rotation angle sensor 58d that detects the angle at which the steering wheel 17 rotates. The control unit 53 also includes a suspension mode switch 58e that changes the extent of electric control on the driving-wheel suspension device 30. The accelerator opening degree sensor 58a, shift-lever position sensor 58b, brake pedal stroke sensor 58c, steering-wheel rotation angle sensor 58d, and suspension mode switch 58e are provided on the body 13 side.

The accelerator pedal 18 and the accelerator opening degree sensor 58a are connected to each other with a signal line 59a. Through this signal line 59a, the accelerator opening degree sensor 58a can detect the amount of which a user, who is a driver sitting in the driver's seat 16, has depressed the accelerator pedal 18. The shift lever 20 and the shift-lever position sensor 58b are connected to each other with a signal line 59b. Through the signal line 59b, the shift-lever position sensor 58b can detect the position of the shift lever 20 that has been moved by the user who is a driver sitting in the seat 16. The brake pedal 19 and the brake pedal stroke sensor 58c are connected to each other with a signal line 59c. Through this signal line 59c, the brake pedal stroke sensor 58c can detect the amount of which the user, who is a driver sitting in the driver's seat 16, has depressed the brake pedal 19. The steering wheel 17 and the steering-wheel rotation angle sensor 58d are connected to each other with a signal line 59d. Through the signal line 59d, the steering-wheel rotation angle sensor 58d can detect the rotation angle of the steering wheel 17 that has been moved by the user who is a driver sitting in the seat 16.

In addition, the accelerator opening degree sensor 58a, shift-lever position sensor 58b, brake pedal stroke sensor 58c, steering-wheel rotation angle sensor 58d, and suspension mode switch 58e are provided with signal lines 60a, 60b, 60c, 60d, 60e extending toward the body connector 54a, respectively. Connecting the body connector 54a to the driving module connector 54b connects the signal line 57e to the signal line 60a, the signal line 57f to the signal line 60b, the signal line 57b to the signal line 60c, the signal line 57c to the signal line 60d, and the signal line 57d to the signal line 60e.

Figure 6:
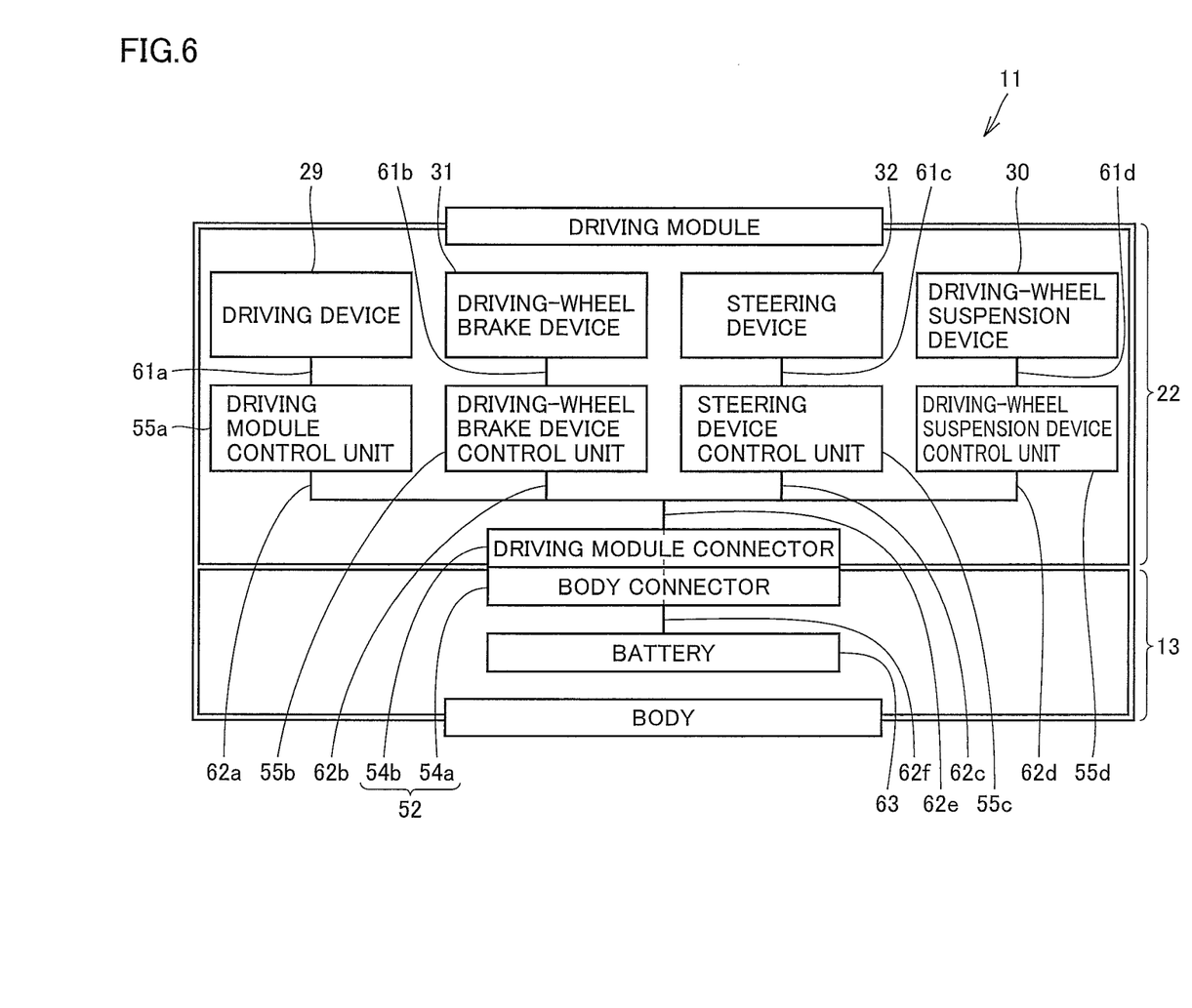
FIG. 6 is a block diagram illustrating the connectivity relationship of power lines to show the electric power connection of the electric vehicle in FIG. 1 according to the embodiment of the invention.

The above-described electric vehicle 11 according to the embodiment of the invention includes a battery that supplies electric power to the driving module 22. FIG. 6 is a block diagram showing the connectivity relationship of power lines connected with the connection unit in the electric vehicle 11 of FIG. 1.

Referring to FIG. 6, the driving module 22 in the electric vehicle 11 includes, as described above, a driving device 29, a driving-wheel brake device 31, a steering device 32, a driving-wheel suspension device 30, a driving device control unit 55a, a driving-wheel brake device control unit 55b, a steering device control unit 55c, and a driving-wheel suspension device control unit 55d. The driving device 29 and the driving device control unit 55a are connected to each other with a power line 61*a*. The driving-wheel brake device 31 and driving-wheel brake device control unit 55*b* are connected to each other with a power line 61*b*. The steering device 32 and steering device control unit 55*c* are connected to each other with a power line 61*c*. The driving-wheel suspension device 30 and driving-wheel suspension device control unit 55*d* are connected to each other with a power line 61*d*. The driving device control unit 55*a*, driving-wheel brake device control unit 55*b*, steering device control unit 55*c*, and driving-wheel suspension device control unit 55*d* are provided with power lines 62*a*, 62*b*, 62*c*, 62*d* extending toward the driving module connector 54*b*, respectively. The power lines 62*a* to 62*d* converge into a single power line 62*e* before reaching the driving module connector 54*b*.

The body 13 in the electric vehicle 11 has a battery 63 that supplies electric power to the driving module 22. The battery 63 is connected to the body connector 54*a* with a power line 62*f*. Connecting the body connector 54*a* to the driving module connector 54*b* makes a connection between the power line 62*e* and the power line 62*f*. Thus, electric power can be supplied from the battery 63 provided on the body 13 side to the components making up the driving module 22, including the components making up the driving device 29, the components making up the driving-wheel brake device 31, and so on.

Next, operation of the electric vehicle 11 being manipulated by a user will be described. In this case, attachment of the sub-frame 26 to the body frame 12 maintains the relative position relationship between the body 13 and the driving module 22. By connecting the body connector 54*a* to the driving module connector 54*b*, the body 13 and the driving module 22 are connected to each other with the signal line 57*b* and the other lines. In addition, connecting the body connector 54*a* to the driving module connector 54*b* makes a connection between the body 13 and the driving module 22 with the power line 62*e* and the other lines.

Referring to FIGS. 1 to 6, firstly, a user gets into the electric vehicle 11 and starts the electric vehicle 11. Since the body connector 54*a* and the driving module connector 54*b* are connected to each other, electric power is supplied from the battery 63 to the respective components making up the driving module 22 via the power line 62*e* and the other lines. Then, the user manipulates a shift lever 20 to start moving the electric vehicle 11. In this case, for example, the shift lever 20 is moved to the drive position. Then, the user depresses an accelerator pedal 18. In response to that, the accelerator opening degree sensor 58*a* provided on the body 13 side detects the opening degree of the accelerator pedal 18, the shift-lever position sensor 58*b* provided on the body 13 side detects the position of the shift lever 20, and then the detection signals are transmitted to the driving device control unit 55*a* via the signal lines 60*a*, 60*b*, 57*e*, 57*f*, 57*a*. The detection signals are then transmitted to the driving device 29 via the signal line 56*a*. In turn, the driving device 29 starts rotating the motor 28 and adjusts the torque generated by the motor 28 in accordance with the opening degree of the accelerator pedal 18 to propel the electric vehicle 11.

At this point, the user manipulates the suspension mode switch 58*e* provided on the body 13 side to change the control of the driving-wheel suspension device 30. In response to the change, the switch signal is transmitted to the driving-wheel suspension device control unit 55*d* via the signal lines 60*e*, 57*d*. Then, the driving-wheel suspension device control unit 55*d* transmits a control signal to change the extent of electric control on the driving-wheel suspension device 30.

Next, consider a case where the user steers the electric vehicle 11 to turn to the left. The user sitting in the seat 16 turns the steering wheel 17 counterclockwise. The steering wheel 17 is provided on the body 13 side. It is configured so that the rotation amount corresponds to the angle at which the user would like to turn. Specifically, if the user would like to turn to the left at a large angle, the user rotates the steering wheel 17 counterclockwise to a great extent. On the other hand, if the user would like to turn left at a small angle, the user rotates the steering wheel 17 counterclockwise to a small extent.

Then, the rotation angle of the steering wheel 17 rotated by the user is detected by the steering-wheel rotation angle sensor 58*d*. Then, the detection signal is transmitted to the steering device control unit 55*c* via the signal lines 60*d*, 57*c*. Then, the detection signal is transmitted to the steering device 32 via the signal line 56*c*. In response to that, the steering device 32 changes the angle of the driving wheels 27*a*, 27*b* to a desired angle. Consequently, the electric vehicle 11 can turn to the left to travel forward.

Next, consider a case where the user stops the electric vehicle 11 which has started moving. The user sitting in the seat 16 depresses the brake pedal 19 of the traveling electric vehicle 11. In response to the depression, the brake pedal stroke sensor 58*c* provided on the body 13 side detects the amount of depression applied by the brake pedal 19 and then transmits the detection signal to the driving-wheel brake device control unit 55*b* via the signal lines 60*c*, 57*b*. Then, the detection signal is transmitted to the driving-wheel brake device 31 via the signal line 56*b*. In response to the detection signal, for example, the driving-wheel brake device 31 moves the left and right brake calipers 43*a*, 43*b* to catch the left and right brake discs 42*a*, 42*b*, thereby stopping the rotation of the driving wheels 27*a*, 27*b*. Thus, the electric vehicle 11 stops. In this manner, the user operates the electric vehicle 11. In short, the driving device 29 performs so-called drive-by-wire operation, the driving-wheel brake device 31 performs so-called brake-by-wire operation, and the steering device 32 performs so-called steer-by-wire operation.

According to such an electric vehicle 11, since the body frame 12 in the body 13 and the sub-frame 26 in the driving module 22 are detachable, the user can select a desired body 13 from the various prepared bodies 13 so as to meet the user's demand and application and also can select a desired driving module 22 from the various prepared driving modules 22, thereby building an electric vehicle 11 by attaching the selected body 13 to the selected driving module 22. If the demand of the user changes, the user can remove the body 13 side or driving module 22 side to meet the changes and install a desired body 13 or desired driving module 22. In this case, the body 13 includes the body frame 12, the driving module 22 includes the sub-frame 26, driving device 29 and the other components. When the sub-frame 26 is attached to the body frame 12, the body 13 and driving module 22 are connected to each other with signal lines and the driving module 22 is controlled under input signals input from the body 13 side. According to the configuration, there are no problems in operation of the electric vehicle 11. Thus, a user's desired electric vehicle 11 can be readily constructed by combining the body 13 and driving module 22.

Since the battery 63 is provided on the body 13 side, electric power can be supplied from the body 13 side, thereby simplifying the structure of the driving module 22.

Although the battery 63 is provided on the body 13 side in the above-described embodiment, the present invention is not limited thereto and the battery can be provided on both the body side and driving module side.

Figure 7:
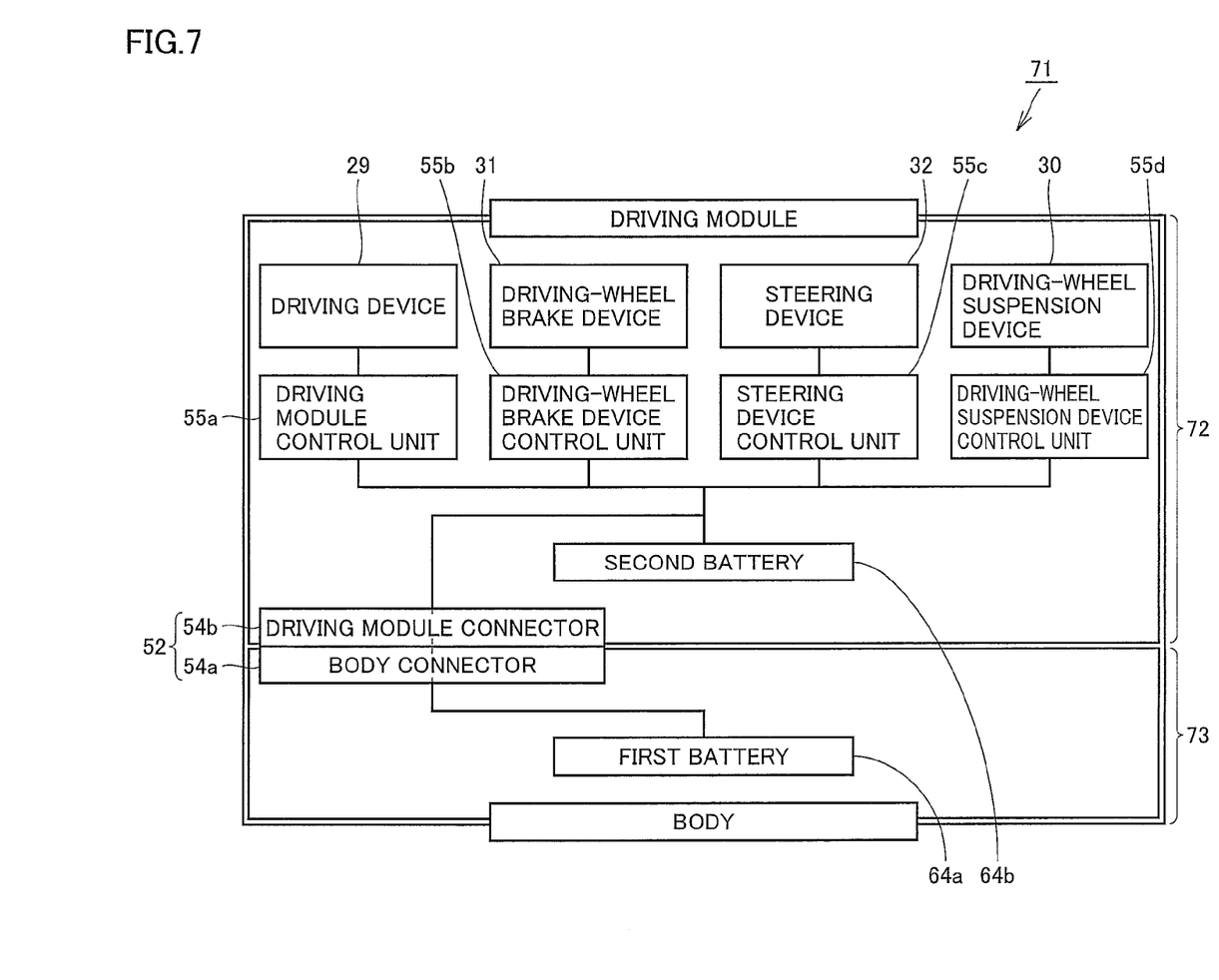
FIG. 7 is a block diagram illustrating the connectivity relationship of power lines to show the electric power connection of the electric vehicle according to another embodiment of the invention.

FIG. 7 is a block diagram showing the connectivity relationship of power lines to represent electric connection in an electric vehicle with batteries. FIG. 7 corresponds to FIG. 6.

Referring to FIG. 7, an electric vehicle 71 according to another embodiment of the present invention includes: a body 73 that includes a body frame; a driving module 72 that includes a sub-frame detachable from the body frame, driving wheels, a driving device 29 having a motor mounted on the sub-frame and applying driving force to the driving wheels to start or accelerate the electric vehicle, a driving-wheel suspension device 30 attached to the sub-frame, a driving-wheel brake device 31 stopping or decelerating the electric vehicle 71, and some other components; a connection unit 52 that maintains the relative position relationship between the body 73 and driving module 72 upon attachment of the sub-frame to the body frame and connects the body 73 to the driving module 72 with signal lines; and control units 55a, 55b, 55c, 55 that control the driving module 72 under input signals input from the body 73 side through the signal lines connected with the connection unit 52.

The electric vehicle 71 includes a first battery 64a and a second battery 64b for supplying electric power to the driving module 72. The first battery 64a is provided on the body 73 side, while the second battery 64b is provided on the driving module 72 side. The other configurations are basically the same as those of the above-described electric vehicle 11, and therefore the explanation is not reiterated.

According to the configuration, electric power can be efficiently supplied from both the batteries 64a, 64b. Even if power supply from one of the batteries is stopped, the other battery can supply electric power, thereby avoiding the risk of a halt of the electric vehicle 71 due to battery exhaustion.

Figure 8:
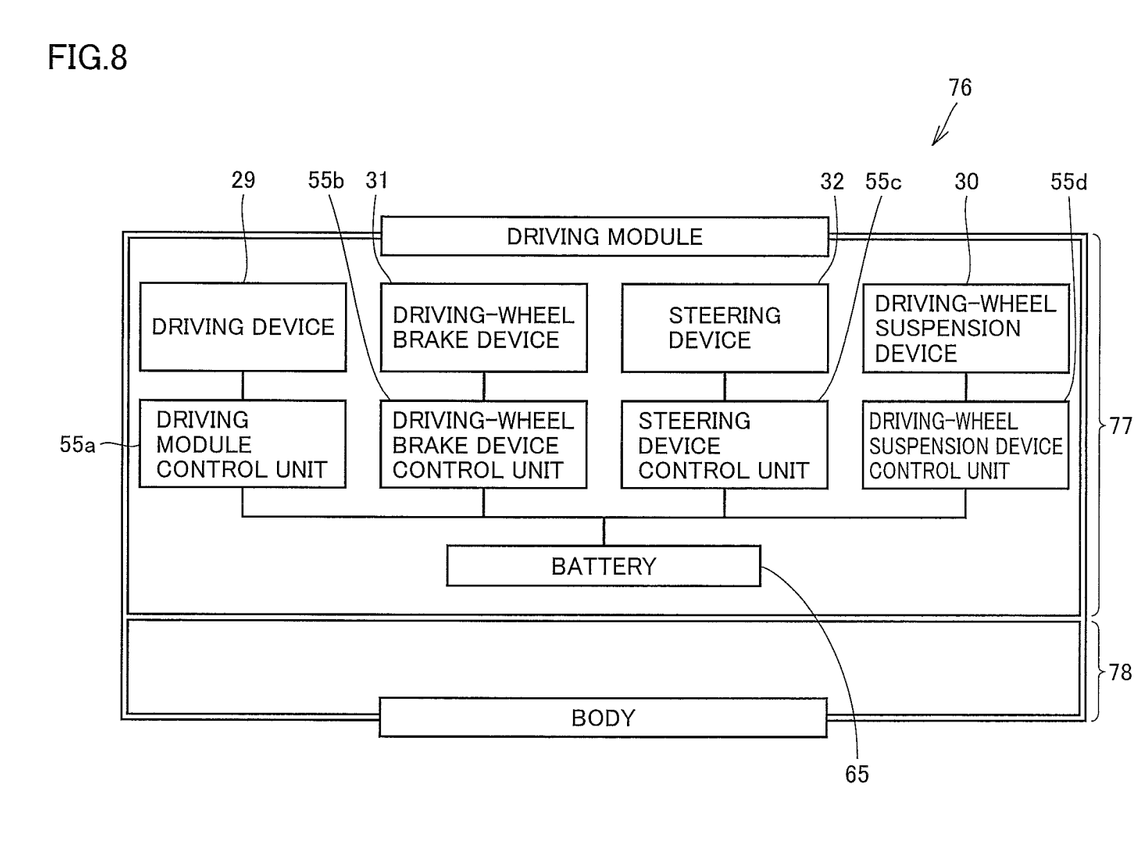
FIG. 8 is a block diagram illustrating the connectivity relationship of power lines to show the electric power connection of the electric vehicle according to yet another embodiment of the invention.

There is no problem to configure the electric vehicle to have a battery only on the driving module side. FIG. 8 is a block diagram showing the connectivity relationship of power lines to represent electric connection in an electric vehicle with a battery. FIG. 8 corresponds to FIGS. 6 and 7.

Referring to FIG. 8, an electric vehicle 76 according to yet another embodiment of the present invention includes: a body 78 that includes a body frame; a driving module 77 that includes a sub-frame detachable from the body frame, driving wheels, a driving device 29 having a motor mounted on the sub-frame and applying driving force to the driving wheels to start or accelerate the electric vehicle, a driving-wheel suspension device 30 attached to the sub-frame, a driving-wheel brake device 31 stopping or decelerating the electric vehicle 76, and some other components; a connection unit (not shown) that maintains the relative position relationship between the body 78 and driving module 77 upon attachment of the sub-frame to the body frame and connects the body 78 to the driving module 77 with signal lines; and control units 55a, 55b, 55c, 55 that control the driving module 77 under input signals input from the body 78 side through the signal lines connected with the connection unit. A battery 65 is provided on the driving module 77 side. The other configurations are basically the same as those of the above-described electric vehicle 11, and therefore the explanation is not reiterated.

This configuration can mitigate the load on the body side. In addition, this configuration makes it possible to mount a battery that matches the power rating and other requirements of the components, such as the driving device, included in the driving module 77, thereby offering a more effective combination of the body and driving module.

Although a one-motor system electric vehicle is used in the above-described embodiments, the present invention is not limited thereto and can be also applied to two-motor system electric vehicles.

Figure 9:
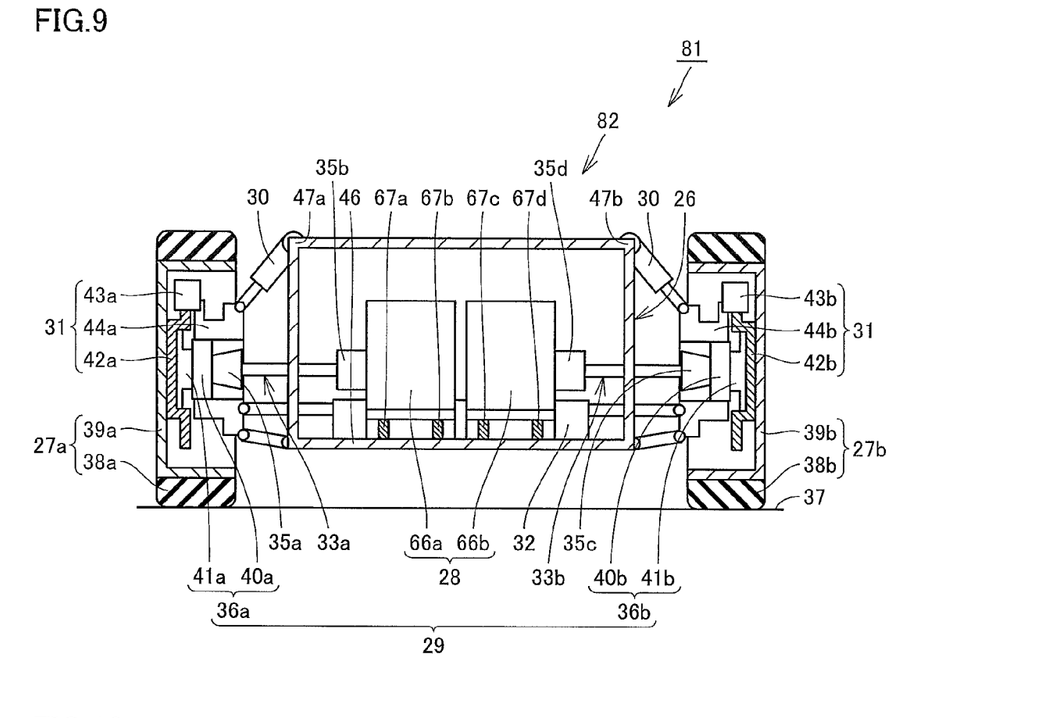
FIG. 9 is a schematic cross-sectional view illustrating the configuration of the driving module provided to the electric vehicle according to yet another embodiment of the invention.

FIG. 9 is a schematic cross-sectional view illustrating the configuration of a driving module 82 provided to an electric vehicle 81 adopting a two-motor system. FIG. 9 corresponds to the cross section in FIG. 4.

Referring to FIG. 9, an electric vehicle 81 according to yet another embodiment of the present invention includes: a body that includes a body frame; a driving module 82 that includes a sub-frame 26 detachable from the body frame, a left-right pair of driving wheels 27a, 27b, a driving device 29 having a motor 28 mounted on the sub-frame 26 and applying driving force to the driving wheels 27a, 27b to start or accelerate the electric vehicle 81, a driving-wheel suspension device 30 attached to the sub-frame 26, a driving-wheel brake device 31 stopping or decelerating the electric vehicle 81, and some other components; a connection unit that maintains the relative position relationship between the body and driving module 82 upon attachment of the sub-frame 26 to the body frame and connects the body to the driving module 82 with signal lines; and a control unit that controls the driving module 82 under input signals input from the body side through the signal lines connected with the connection unit.

In this embodiment, the motor 28 is configured to include a first motor 66a for driving the driving wheel 27a and a second motor 66b for driving the driving wheel 27b. The first motor 66a is placed on the upper side of a plate portion 46 with a left-right pair of bushing mounts 67a, 67b interposed therebetween. The second motor 66b is placed on the upper side of the plate portion 46 with a left-right pair of bushing mounts 67c, 67d interposed therebetween. The other configurations are basically the same as those of the above-described electric vehicle 11, and therefore the explanation is not reiterated.

In short, the electric vehicle 81 adopts a two-motor system. The electric vehicle 81 even configured as above can produce the aforementioned effects.

Although a two-motor system or one-motor system electric vehicle is used in the above-described embodiments, the present invention is not limited thereto and also can be applied to in-wheel motor electric vehicles.

Figure 10:
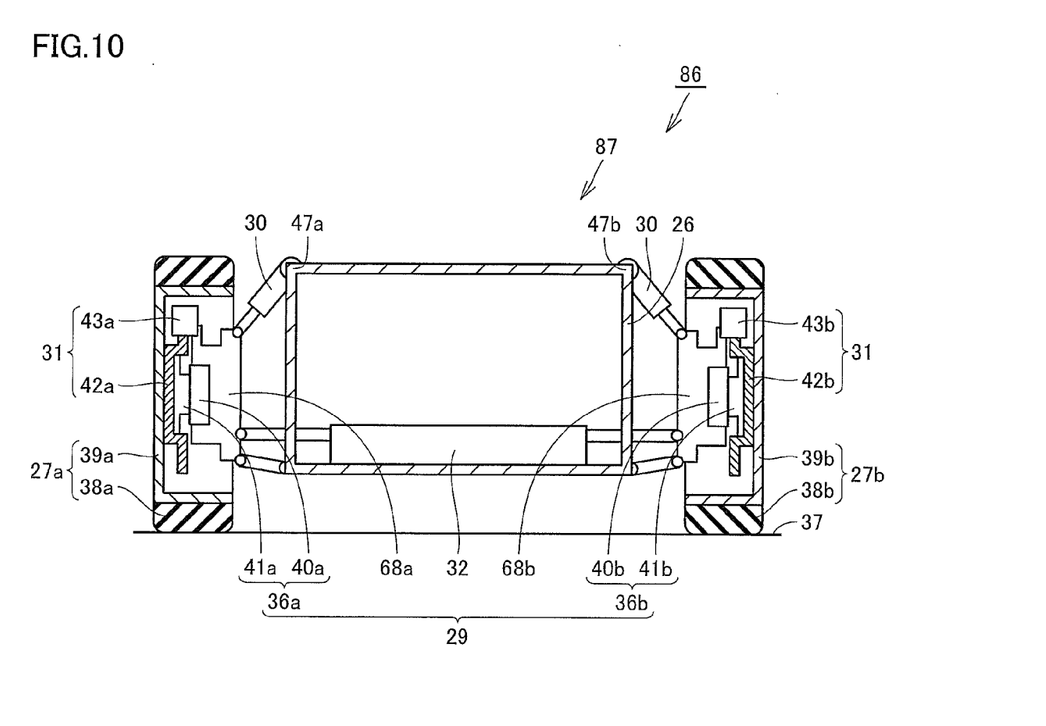
FIG. 10 is a schematic cross-sectional view illustrating the configuration of the driving module provided to the electric vehicle according to yet another embodiment of the invention.

FIG. 10 is a schematic cross-sectional view illustrating the configuration of a driving module 87 provided to an electric vehicle 86 adopting an in-wheel motor system. FIG. 10 corresponds to cross sections in FIGS. 4 and 9.

Referring to FIG. 10, an electric vehicle 86 according to yet another embodiment of the present invention includes: a body that includes a body frame; a driving module 87 that includes a sub-frame 26 detachable from the body frame, a left-right pair of driving wheels 27a, 27b, a driving device 29 having in-wheel motors 68a, 68b mounted on the sub-frame 26 and applying driving force to the driving wheels 27a, 27b to start or accelerate the electric vehicle 86, a driving-wheel suspension device 30 attached to the sub-frame 26, a driving-wheel brake device 31 stopping or decelerating the electric vehicle 86, and some other components; a connection unit that maintains the relative position relationship between the body and driving module 87 upon attachment of the sub-frame 26 to the body frame and connects the body to the driving module 87 with signal lines; and a control unit that controls the driving module 82 under input signals input from the body side through the signal lines connected with the connection unit. The other configurations are basically the same as those of the above-described electric vehicle 11, and therefore the explanation is not reiterated.

In short, the electric vehicle 86 adopts an in-wheel motor system. The electric vehicle 86 even configured as above can produce the aforementioned effects.

Although descriptions have been made using the terms, such as drive-by-wire, brake-by-wire, and steer-by-wire in the embodiments, drive-by-wire, brake-by-wire, and steer-by-wire are broadly interpreted so as to include signal communications using optical fiber.

In addition, although the wheels arranged on the front side of the body frame are configured to function as driving wheels and the wheels arranged on the rear side are configured to function as driven wheels in the above-described embodiments, the present invention is not limited thereto and can be applied to an electric vehicle having driving wheels arranged on the rear side of the body frame and driven wheels arranged on the front side. In short, a rear-wheel drive system can be adopted. Furthermore, all the wheels arranged on the front side and rear side of the body frame can be configured to function as driving wheels. In this case, the electric vehicle is to adopt a four-wheel drive system in which all four wheels function as driving wheels.

Although the electric vehicle in the above-described embodiments is configured to have a left-right pair of driving wheels, the present invention is not limited thereto and can be applied to electric vehicles having only one driving wheel. In this case, for example, the electric vehicle may be a so-called motorized three-wheeler having one driving wheel at the front and two driven wheels at the rear. Furthermore, the electric vehicle may be a two-wheeler or five-wheeler.

Although the driven module in the above-described embodiments is fixedly attached to the body, the present invention is not limited thereto and the driven module can be configured to be detachable from the sub-frame just as in the case of the driving module. Furthermore, the driven module can be configured to include a driven-wheel brake device.

In addition, although the driving module includes the steering device in the above-described embodiments, the present invention is not limited thereto and the driven module can be configured to include the steering device. Specifically, the electric vehicle can be configured so at to include a steering device that steers at least one of a set of driving wheels and a set of driven wheels.

The electric vehicle can be configured so as to include a speed reduction unit as a drive unit to reduce the rotational speed of the motor. In this case, for example, the speed reduction unit can be placed between a motor and a wheel. The speed reduction unit may be a cycloidal speed reducer or planetary speed reducer. If a cycloidal speed reducer is employed, it will contribute to weight reduction of the electric vehicle because the cycloidal reduction gear has a high reduction ratio and a motor can be downsized in accordance with necessary torque for the vehicle. For slow-moving lightweight vehicles not requiring high reduction ratios, the planetary speed reducer may be preferable.

In addition, connection of signal lines between the body side and driving module side is established by coupling one body connector to one driving module connector in the above-described embodiments, the present invention is not limited thereto and two or more connectors can be provided. Specifically, for example, the connector can be provided to each of the devices including the driving device and steering device. In a case of using a single connector, insertion and removal of the connector are easy, on the other hand, in a case of using a plurality of connectors, connection can be established with connectors each suitable for the respective devices.

Although the electric vehicle is driven by an accelerator pedal in the above-described embodiments, the present invention is not limited thereto and an accelerator lever can be used. Specifically, for example, the user manipulates the accelerator lever to change the rotation or position or to perform other operations. The displacement or the like caused by the manipulation of the accelerator lever is converted into an input signal. Based on the input signal of the displacement, the motor is rotated to drive the driving wheels in order to start or accelerate the electric vehicle. In other words, the electric vehicle can be configured so that the body includes an accelerator pedal or an accelerator lever provided on the body frame and the control unit controls the motor under a signal based on the amount that the accelerator pedal is depressed or a signal based on the amount of change in the angle of the accelerator lever, both the signals being input from the body side.

Similarly, a brake lever can be used instead of the brake pedal. In this case, the electric vehicle can be configured so that the body includes a brake pedal or a brake lever provided on the body frame and the control unit controls at least one of the driving-wheel brake device and driven-wheel brake device under a signal based on the amount that the brake pedal is depressed or a signal based on the amount of change in the angle of the brake lever, both the signals being input from the body side.

Similarly, a steering lever can be used instead of the steering wheel.

The electric vehicle also can be configured so that at least one of the driving-wheel suspension device and driven-wheel suspension device includes a damper for absorbing shock and the damper is actuated or stopped by a motor intended for the damper.

The foregoing has described the embodiments of the present invention by referring to the drawings. However, the invention should not be limited to the illustrated embodiments. It should be appreciated that various modifications and changes can be made to the illustrated embodiments within the scope of the appended claims and their equivalents.

INDUSTRIAL APPLICABILITY

The electric vehicle according to the present invention is advantageously used to meet the demands for easy availability of electric vehicles configured to fit the user's own needs.

REFERENCE SIGNS LIST 11, 71, 76, 81, 86 electric vehicle
12 body frame
13, 73, 78 body
14a, 14b door
15a front glass
15b, 15c, 15d window
16 seat
17 steering wheel
18 accelerator pedal
19 brake pedal
20 shift lever
21a front wheel
21b rear wheel
22, 72, 77, 82, 87 driving module
23 driven module
24 propulsion module
25a, 25b recessed portion
26 sub-frame
27a, 27b driving wheel 28, 66a, 66b motor
29 driving device
30 driving-wheel suspension device
31 driving-wheel brake device
32 steering device
33a, 33b drive shaft
34 differential gear
35a, 35b, 35c, 35d constant-velocity joint
36a, 36b driving-wheel bearing device
37 road surface
38a, 38b tire
39a, 39b wheel
40a, 40b bearing
41a, 41b wheel hub
42a, 42b brake disc
43a, 43b brake caliper
44a, 44b brake knuckle
45a, 45b, 67a, 67b, 67c, 67d bushing mount
46 plate portion
47a, 47b corner
52 connection unit
53, 55a, 55b, 55c, 55d control unit
54a, 54b connector
56a, 56b, 56c, 56d, 57a, 57b, 57c, 57d, 57e, 57f, 59a, 59b, 59c, 59d, 60a, 60b,
60c, 60d, 60e signal line
58a, 58b, 58c, 58d sensor
58e switch
61a, 61b, 61c, 61d, 62a, 62b, 62c, 62d, 62e, 62f power line
63, 64a, 64b, 65 battery
68a, 68b in-wheel motor

The invention claimed is:

1. An electric vehicle propelled by a motor that rotates to drive driving wheels, comprising:
a body that includes a body frame;
a driving module that includes a sub-frame detachable from the body frame, driving wheels, a driving device provided with a motor mounted on the sub-frame and applying driving force to the driving wheels to start or accelerate the electric vehicle, a driving-wheel suspension device attached to the sub-frame, a driving module control unit that receives signals from the body and controls driving of the electric vehicle, and a driving-wheel brake device stopping or decelerating the electric vehicle; and
a connection unit that maintains the relative position relationship between the body and the driving module upon attachment of the sub-frame to the body frame, and connects the body and the driving module with signal lines.

2. The electric vehicle according to claim 1, comprising a driven module that includes driven wheels and a driven-wheel suspension device.

3. The electric vehicle according to claim 1, wherein the driving module includes
a steering device that steers the driving wheels.

4. The electric vehicle according to claim 1, wherein
the connection unit includes a body connector provided on the body side and a driving-module connector provided on the driving module side, and the signal lines are connected by coupling the body connector to the driving-module connector.

5. The electric vehicle according to claim 1, wherein
the body includes an accelerator pedal or an accelerator lever provided to the body frame, and
the driving module control unit controls the motor under a signal based on the amount that the accelerator pedal is depressed or a signal based on the amount of change in the angle of the accelerator lever, both the signals being input from the body side.

6. The electric vehicle according to claim 1, wherein
the body includes a brake pedal or a brake lever provided to the body frame, and
the driving module further includes a driving wheel brake device control unit,
the driving wheel brake device control unit controls a driving-wheel brake device under a signal based on the amount that the brake pedal is depressed or a signal based on the amount of change in the angle of the brake lever, both the signals being input from the body side.

7. The electric vehicle according to claim 3, wherein
the body includes a steering wheel provided to the body frame, and
the driving module further includes a steering device control unit,
the steering device control unit controls the steering device under a signal based on the amount of change in the angle of the steering wheel and input from the body side.

8. The electric vehicle according to claim 2, wherein
at least one of the driving-wheel suspension device and the driven-wheel suspension device includes a damper for absorbing shock, and
the damper is actuated or stopped by a motor intended for the damper.

9. The electric vehicle according to claim 3, wherein
the driving module includes an inverter used to supply electric power to at least one of the driving device, the driving-wheel brake device, the driving-wheel suspension device, and the steering device.

10. The electric vehicle according to claim 1, wherein
the driving module control unit is a microcomputer.

11. The electric vehicle according to claim 1, comprising
a battery supplying electric power to the driving module, wherein
the battery is provided in the driving module.

12. The electric vehicle according to claim 1, wherein
the body further includes a battery supplying electric power to the driving module,
and
the driving module control unit controls electric power supply from the battery provided on the body side to the driving module when the sub-frame is attached to the body frame with the connection unit.

13. The electric vehicle according to claim 1, wherein
the body frame and sub-frame include engagement units that are engaged with each other.

14. The electric vehicle according to claim 1, wherein
the sub-frame is attached to the body frame with an elastic member interposed therebetween.

15. The electric vehicle according to claim 1, wherein
the motor is mounted on the sub frame with an elastic member interposed therebetween.

16. The electric vehicle according to claim 1, wherein
the driving module adopts at least one of a two-motor system in which two motors drive the driving wheels provided as a pair of left and right driving wheels, respectively, a one-motor system in which a single motor drives both the left and right driving wheels, and an in-wheel motor system in which two in-wheel motors placed at the interior of the left and right driving wheels drive the left and right driving wheels, respectively.

* * * * *